S. V. Collins.
Ruling Mach.
N° 11,146.   Patented Jun. 20, 1854.

Inventor
Sidney V. Collins

UNITED STATES PATENT OFFICE.

S. V. COLLINS, OF CHARLESTOWN, MASSACHUSETTS, ASSIGNOR TO W. O. HICKOK.

MODE OF SETTING AND HOLDING PENS FOR PAPER-RULING.

Specification of Letters Patent No. 11,146, dated June 20, 1854.

*To all whom it may concern:*

Be it known that I, S. V. COLLINS, of the city of Charlestown, in the county of Middlesex and State of Massachusetts, have invented an Improvement in the Mode of Setting and Holding Pens in Ruling-Machines; and I do hereby declare that the following is a full, clear, and accurate description of the construction and operation of the same.

The nature of my invention consists in attaching one or more extension-pens to the pen-rests now in use, the object of these extension-pens being to facilitate the ruling with several different colors, all at the same time and with the utmost exactness.

To enable others skilled in the art, to make and use my invention I will proceed to describe its construction and operation, reference being had to the annexed drawings forming a part of this specification, in which—

Figure 1:
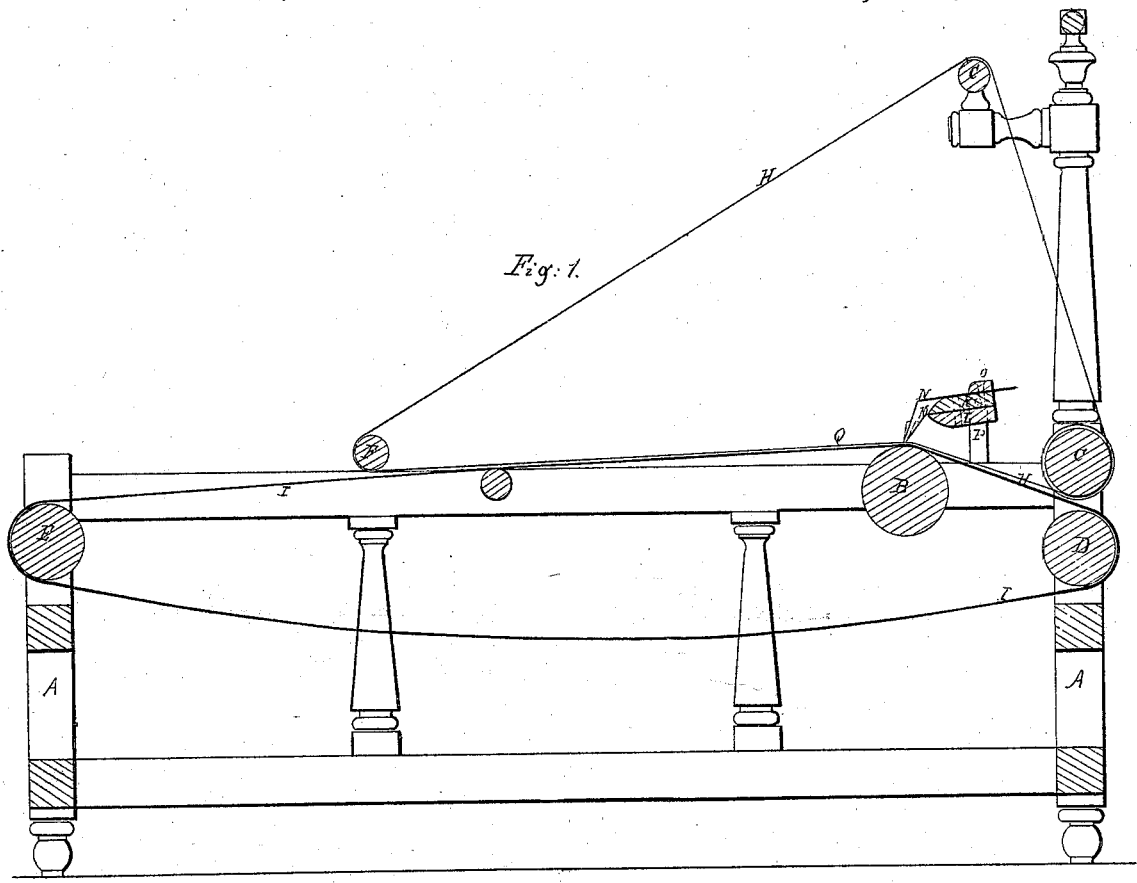
Figure 2:
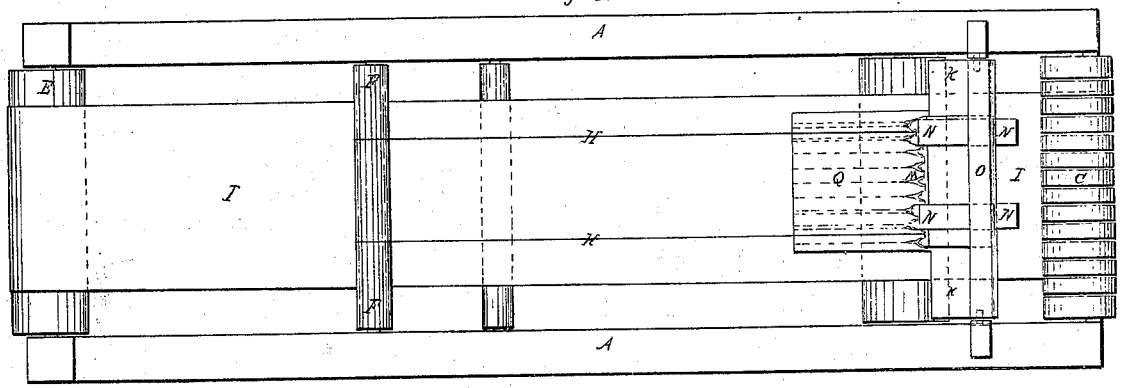

Figure 1 is a side sectional view of a ruling-machine having my improvement attached. Fig. 2 is a top view of the same.

Similar letters refer to like parts.

A is the frame of the machine; B, the ruling-cylinder; C, F, G, guide-rollers; H, guide-thread; D, driving-roller; E, end-roller; I, apron-cloth; K, upper section of guide-rest; L, lower section of the same; M, ruling-pens; N, my improved extension pens; O, adjusting-beam; P, support; Q, sheet of paper.

With ordinary ruling machines the method of applying different colors to the pens is to lay cloths saturated with the colors upon the upper section of the pen-rests K. The liquid passes from the cloth down through the grooves in the pens to the paper. Where it is necessary to rule lines of different colors very closely together this method has many objections, since the colors contained in the different cloths are liable to run together, and so spoil the work. The labor of keeping colors separate is one of the greatest difficulties and hindrances which paper-rulers have to encounter. Neither is it possible to adjust the lines produced by the pens, with that accuracy and delicacy which is oftentimes required.

By the use of my improved extension-pens all the difficulties alluded to are overcome. My extension pen is made in the form shown at N, resting upon the top of the upper section of the rest K, and secured to the upper section K by means of an adjustable beam O, the beam O, being adjusted by screws, as shown. For example, if it is desired to rule two colors, red and blue, as shown in Fig. 2, the faint lines are ruled by the ordinary pens M, while the other color is ruled by extension-pens, the latter being entirely separate, and separately adjustable; the colors fed by them are entirely separate from the colors in the pens M. The coloring-matter for the pens N is contained in cloths placed on the upper surface of pens N, and runs down to the paper Q in the same manner as in the ordinary pens. By means of adjusting beam O, the extension pen can be adjusted to rule in the most accurate manner without any possible commingling of the various colors employed. Indeed, by my improvement it would be possible to rule half a dozen colors, or, even more, each separate from the other, with the utmost nicety and security from commingling, all at one operation.

My improvement possesses several other advantages which will be fully appreciated by paper-rulers, such as enabling them to produce head-lines at different parts of the sheet, without the slightest difficulty, &c.

Having thus described my invention, I claim—

The extension pens, N, and adjusting-beam O, constructed and combined for the purposes and in the manner set forth, or in any other manner substantially the same.

S. V. COLLINS. [L. s.]

Witnesses:
EDWARD A. DANA,
PAUL WILLARD, Sr.